(12) United States Patent  (10) Patent No.: US 8,336,095 B2
Lam et al.  (45) Date of Patent: Dec. 18, 2012

(54) USER SPACE VIRTUALIZATION SYSTEM

(75) Inventors: Ioi Lam, Mountain View, CA (US);
Junichi Monma, Tokyo (JP)

(73) Assignee: Aplix Corporation, Tokyo (JP)

( * ) Notice: Subject to any disclaimer, the term of this patent is extended or adjusted under 35 U.S.C. 154(b) by 316 days.

(21) Appl. No.: 11/880,938

(22) Filed: Jul. 24, 2007

(65) Prior Publication Data

US 2008/0047023 A1 Feb. 21, 2008

Related U.S. Application Data

(60) Provisional application No. 60/859,673, filed on Nov. 17, 2006.

(30) Foreign Application Priority Data

Jul. 24, 2006 (JP) ................................. 2006-201037

(51) Int. Cl.
*G06F 21/00* (2006.01)
(52) U.S. Cl. ............................ 726/17; 713/164; 713/189
(58) Field of Classification Search ........................ None
See application file for complete search history.

(56) References Cited

U.S. PATENT DOCUMENTS

| | | | | |
|---|---|---|---|---|
| 5,974,549 | A * | 10/1999 | Golan | 726/23 |
| 6,275,938 | B1 * | 8/2001 | Bond et al. | 726/23 |
| 6,505,300 | B2 | 1/2003 | Chan et al. | |
| 2005/0076237 | A1 | 4/2005 | Cohen et al. | |
| 2007/0050854 | A1 * | 3/2007 | Cooperstein et al. | 726/30 |

FOREIGN PATENT DOCUMENTS

WO 02/103498 A2 12/2002

OTHER PUBLICATIONS

Bestavros, A. et al. (Jun. 29, 2006). "Friendly Virtual Machines: Leveraging a Feedback-Control for Application Adaptation," located at <http://www.vmware.com/pdf/fvm06292006.pdf>, last visited on Oct. 20, 2008, 11 pages.

(Continued)

*Primary Examiner* — Gilberto Barron, Jr.
*Assistant Examiner* — Izunna Okeke
(74) *Attorney, Agent, or Firm* — Morrison & Foerster LLP

(57) ABSTRACT

A user-space virtualization (USV) program to allow legacy applications in embedded systems to share resources without modification without compromising security is provided. A computer-implemented USV program may be characterized by a method in a user-space including retrieving a native code of an application, and identifying an instruction sequence. Further, identifying the instruction sequence includes, first, determining if executing the instruction sequence to perform processing is a possible security risk. If it is a possible security risk, then confirming that there is an execute authority for an active application. Execute authority may be confirmed by a security manager or a processor. If it is confirmed by the security manager that the active application has the execute authority for processing, then executing the instruction sequence with a processor. If the active application has no execute authority for processing, then not executing the instruction sequence. On the other hand, if executing the instruction sequence to perform processing is not a possible security risk, then executing the instruction sequence with the processor.

16 Claims, 7 Drawing Sheets

OTHER PUBLICATIONS

Chaubal, C. (2007). "Security Design of the VMware Infrastructure 3 Architecture," located at <http://www.vmware.com/pdf/vi3_security_architecture_wp.pdf>, last visited on Oct. 20, 2008, 12 pages.

International Search Report and Written Opinion mailed on Sep. 23, 2008, for PCT Application No. PCT/US07/16672 filed on Jul. 24, 2007, 10 pages.

"QEMU Internals," QEMU. (Feb. 5, 2007). Located at <http://fabrice.bellard.free.fr/qemu/qemu-tech.html>, last visited on Aug. 31, 2007. (7 pages).

Shackman, M. (Date Unknown). "Platform Security—a Technical Overview," Symbian, pp. 1-12, located at <http://developer.symbian.com/main/downloads/papers/plat_sec_tech_overview/platform_security_a_technical_overview.pdf>.

Thompson, K. (Mar. 2003). "SELinux," *Sys Admin Magazine*, located at <http://www.samag.com/documents/s=7835/sam0303a/0303a.htm>, last visited on Aug. 31, 2007. (6 pages).

"The User-Mode Linux Kernal Home Page," located at <http://user-mode-linux.sourceforge.net/>, last visited on Aug. 31, 2007. (3 pages).

VMWare. "Virtual Network User Mode Linux," last updated May 16, 2007, located at <http://www.vmware.com/appliances/directory/876 >, last visited on Oct. 20, 2008, 2 pages.

"Xen—The Xen Virtual Machine Monitor," (2007). University of Cambridge, located at <http://www.cl.cam.ac.uk/research/srg/netos/xen/>, last visited on Aug. 31, 2007. (1 page).

Office Action for Chinese Patent Application No. 200780035408.0, issued on Jul. 29, 2011, 10 pages (6 pages of English Translation and 4 pages Of Office Action).

Extended European Search Report for European Patent Application No. 07836221.7, mailed on Dec. 6, 2010, 5 pages.

Office Action for Chinese Patent Application No. 200780035408.0, mailed on Nov. 5, 2010, 14 pages (8 pages of English Translation & 6 pages of Office Action).

\* cited by examiner

FIG. 6
```
str    lr, [sp, #-4]!
str    r2, [sp, #-4]!
str    r1, [sp, #-4]!
str    r0, [sp, #-4]!
mvn    r0, #61440
mov    lr, pc
sub    pc, r0, #31      ; <= trap to kernel
```

FIG. 7
```
/* handles the case of pc = reg - #imm */
void sub_pc_reg_imm(Register reg, Imm32 imm) {
    if (reg == R0 && imm == 32 &&
        registers[R0] == -61440) {
        /* app issues open() system call*/
        check_open_syscall_params();
        do_real_open_syscall();
    }
}
```

FIG. 8
```
str    lr, [sp, #-4]!
str    r2, [sp, #-4]!
str    r1, [sp, #-4]!
str    r0, [sp, #-4]!
mvn    r0, #61440
mov    lr, pc
sub    pc, r0, #31      ; <= trap to kernel
```

FIG. 9
```
str    lr, [sp, #-4]!
str    r2, [sp, #-4]!
str    r1, [sp, #-4]!
str    r0, [sp, #-4]!
mvn    r0, #61440
ldr    lr, [pc, #48]
b      intercept_open
```

USER SPACE VIRTUALIZATION SYSTEM

CROSS-REFERENCE TO RELATED APPLICATIONS

This application claims the benefit under 35 USC 119(e) of prior copending U.S. Provisional Patent Application No. 60/859,673, filed Nov. 17, 2006, and further claims priority to Japanese patent application No. 2006-201037, filed Jul. 24, 2006, both of which are hereby incorporated by reference in their entirety.

BACKGROUND OF THE INVENTION

This invention is related to emulation and dynamic compiling technology used to create a user-space virtualization program.

The latest platforms used for embedded systems require a resource management system to arbitrate and protect system resources. Such resource management systems often provide application programming interfaces (API) for arbitrating or protecting system resources. However, to maximize the functionality of embedded systems, it is sometimes desirable to execute untrusted applications, or legacy applications, that do not use the resource management systems of the platform. Therefore, a method to control the system resources of the platform and extend its security policy for the aforementioned applications is also required in embedded systems.

Traditionally, access control mechanisms have been incorporated in many existing operating systems except embedded products. Well-known examples include user permission checks in Linux™. In this case, each file is related to owner user's ID and permission mode, which serves as an indication of whether certain users are accessible to the file. Additionally, it is possible to restrict certain system calls so that they are called only from a super user ID. Furthermore, the Linux "chroot" system call can restrict a portion of file system from being viewable from certain processes.

A problem in a method utilizing a user ID and permissions in existing Linux is that it cannot control restriction granularity adequately. For example, regardless of a security policy, whoever owns a file can access his/her own file and arbitrarily change access restriction. The SELinux subsystem copes with this problem by implementing Mandatory Access Control. With Mandatory Access Control, users cannot freely change access restriction even with their own files. Moreover, access can be restricted even for privileged users such as root authorities. However, with SELinux, the Linux kernel has to be arranged and recompiled, which requires a complicated setup and process.

On the contrary, there are many embedded operating systems that do not incorporate access control mechanisms. For example, Symbian (versions 9.1 and lower), or WinCE do not include the idea of a user ID. Most of their file systems (except the system files only accessible from the kernel) are accessible in the user-mode process. In SymbianOS version 9.1, the kernel is modified to reinforce OS security.

However, a significant modification is needed for the OS kernel to implement such OS security. Therefore, it is difficult to avoid the risk of bugs occurring from the modifications. Furthermore, the risk of bugs occurring is inevitable upon each modification of access control features in the kernel, which would accordingly require high cost and may result in a loss of flexibility in the design of access control features. However, regardless of SELinux or the latest SymbianOS, both the access control system and the resource management system are OS-dependent implemented, and such access control systems are not commonly applicable irrespective of OS types.

Recently, virtualization technologies such as VMWare and Xen have been proposed for partitioning resources on desktop and server systems. These technologies can realize access control features. However, because these approaches require duplication of almost an entire operation system image, they are not ideal for embedded platforms with limited computing resources (e.g. memory, etc.).

Therefore, methods and apparatus are desired to allow legacy applications to share resources without modification in embedded systems.

All patents, applications, published applications and other publications referred to herein are incorporated by reference herein in their entirety, including the following references:

SELinux, Kerry Thompson, System Admin Magazine, March 2003, http://www.samag.com/documents/s=7835/sam0303a/0303a.htm Platform Security—a Technical Overview, Version 1.2, Mark Shackman, Symbian Ltd, http://www.symbian.com/developer/techlib/papers/plat_sec_tech_overview/platform/security_a_tec hnical_overview.pdf.

QEMU Internals, Fabrice Bellard, http://fabrice.bellard.free.fr/qemu/qemu-tech.html The Xen Virtual Machine Monitor, http://www.cl.cam.ac.uk/Research/SRG/netos/xen/

VMWare, http://vmware.com/User-Mode Linu, http://user-mode-linux.sourceforge.net/

BRIEF SUMMARY OF THE INVENTION

Embodiments of this invention share resources without modification in embedded systems as User-space Virtualization (USV), used in cell phones and personal digital assistants, for example. Embodiments of this invention also allow the applications that could contain untrusted and malicious code to be executed without affecting system security or privacy. Furthermore, embodiments of invention use the techniques of emulation and dynamic compilation to strictly control the use of resources by applications and enable high performance for execution speed close to the speed of execution of original native code. User-space virtualization is a novel method for resource arbitration and protection on embedded platforms. It is implemented in user space and is flexible to be customized according to operator/OEM resource management policies. It requires little operating system support, so it can run on many popular smartphone platforms. At the same time, it uses dynamic compilation techniques to achieve the same level of performance as alternative techniques (such as modifying the OS kernel).

Embodiments of this invention provide a user-space virtualization (USV) program to allow legacy applications to share resources without modification in embedded systems. A computer-implemented USV program may be characterized by a method in a user-space including retrieving a native code of an application, and identifying an instruction sequence. Identifying the instruction sequence includes, first, determining if executing the instruction sequence to perform processing is a possible security risk. If it is a possible security risk, then confirming with a security manager, or processor, that there is an execute authority for an active application. If it is confirmed that the active application has the execute authority for processing, then executing the instruction sequence with a processor. If the active application has no execute authority for processing, then not executing the instruction sequence. On the other hand, if executing the instruction sequence to perform processing is not a possible security risk, then executing the instruction sequence with the processor.

Furthermore, following not executing the instruction sequence if the active application has no execute authority for processing, the method may include executing an error in the case where the active application has no execute authority for processing. Additionally, following not executing the instruction sequence if the active application has no execute authority for processing, the method may further include executing replacing the instruction sequence with an instruction sequence that executes the processing. The execute authority is associated with the active application, and executing the replaced instruction sequence with the processor. It may also be possible to allow the configuration where the native code having been confirmed for the execute authority of the application if it is confirmed by the security manager that the active application has the execute authority for processing, then executing the instruction sequence with a processor above is directly executed with the processor without confirming with security manager the next time. In this case, it is possible to reduce overhead that is caused by confirming authority for the same command with the security manager multiple times.

Furthermore, in other embodiments, it may be possible to allow detection of an instruction sequence to execute the processing that could affect security of the native code of an application. Additionally, it may be possible to generate native code of the instruction sequence to execute processing that could affect security after confirming execute authority of the application from the native code of the detected instruction sequence, and executing the generated code with CPU.

BRIEF DESCRIPTION OF THE DRAWINGS

FIG. 6 illustrates an instruction sequence that calls a system call according to embodiments of the invention;

FIG. 7 illustrates handling of open( ) system call according to embodiments of the invention;

FIG. 8 illustrates an example of an native instruction sequence before compiling;

FIG. 9 illustrates a safe native instruction generated after compiling the code in FIG. 4 according to embodiments of the invention;

DETAILED DESCRIPTION OF THE INVENTION

As briefly described above, embodiments of the invention allow legacy applications to share resources without modification and applications that could contain untrusted and malicious code to be executed without affecting system security or privacy.

Additionally, the embodiments of the user-space virtualization program can be implemented without modifying the OS kernel. In particular, this can avoid complicated modifications to the kernel that may cause difficulty in system maintenance. Furthermore, applications are executed in the form of native code. Therefore, overhead can be reduced to the minimum level in the user-space virtualization program. In addition, because the user-space virtualization program of this invention can be used regardless of the type of an operating system insomuch as the native code is the same, it can be utilized in platforms with the same CPU regardless of the type of an operating system. Modification may be required, but it would be of a minimal amount. Exemplary embodiments are described as follows with reference to drawings.

Figure 1:
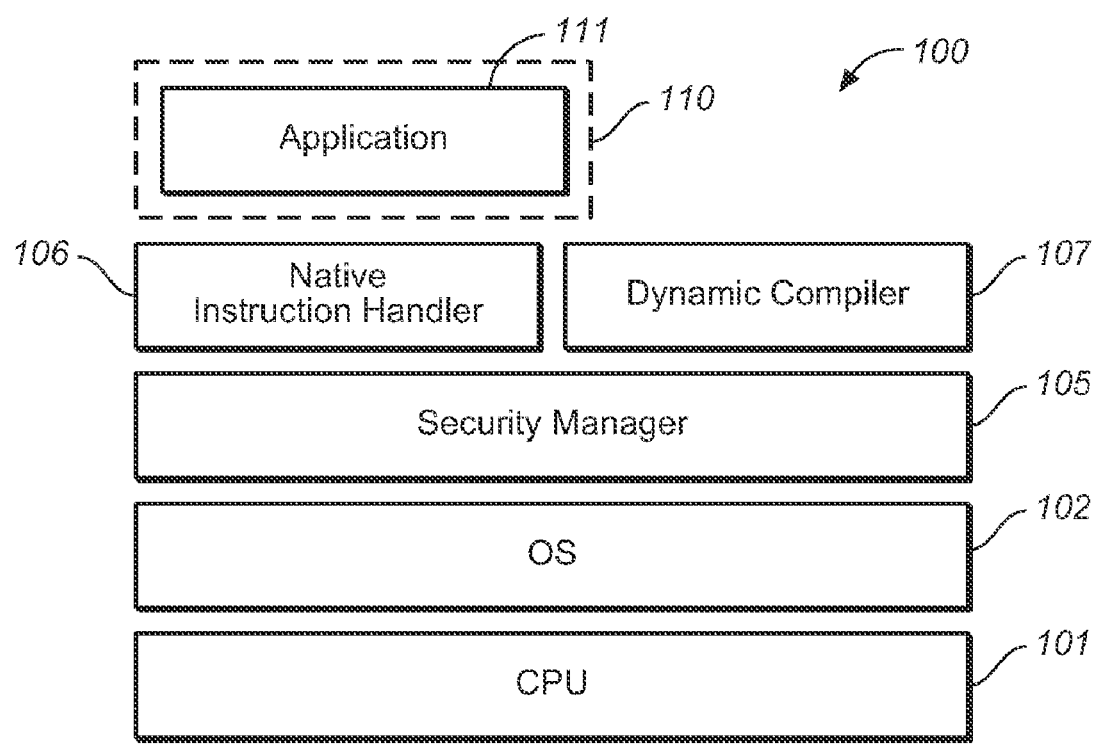
FIG. 1 illustrates a schematic view that shows configuration of an embedded system according to embodiments of the invention.

FIG. 1 is a schematic view of the configuration of an embedded system, both hardware and software 100. The operating system (OS) 102 is implemented on CPU 101 and security manager 105. A native instruction handler 106, and dynamic compiler 107 are utilized by the operating system 102. Application 111 is stored in an untrusted region 110 and is executed in the user-space virtualized by the security manager 105, the native instruction handler 106, and the dynamic compiler 107.

With reference to FIG. 1, functional blocks OS 102, security manager 105, native instruction handler 106, dynamic compiler 107 and application 111 are implemented as software. As a result, these functional blocks are implemented by executing its corresponding software programs by CPU 101.

Embodiments of the invention, in particular, the CPU 101, are described according to ARM processor architecture and ARM instruction sets. However, the CPU 101 according to embodiments of the invention is not limited to ARM. All software programs are stored in memory 103 (ROM/RAM) connected to CPU 101. Memory 113 is accessed by CPU 101 as needed.

OS 102 is embedded in an operating system such as Linux, WinCE, or Symbian, for example. Embodiments of the invention are based on the premise that OS 102 has the following or substantially equivalent functions described below. In other words, an OS having the following or substantially equivalent function may be used according to embodiments of the invention even if the OS is an OS other than described in this document. The functions of the OS, according to embodiments of the invention, are described as follows:

User mode: OS 102 can run corresponding programs of Security manager 105, native instruction handler 106, dynamic compiler 107, and application 111 in user mode so as to prohibit these programs from directly performing privileged instructions such as MMU register modifying instruction.

Memory protection: A memory space of the application 111 is separated from other applications, such as in the kernel.

I/O protection: I/O operations must be performed in supervisor mode and cannot be directly performed by the application 111 (except for memory-mapped I/O of the user-mode).

Well-defined system call interface: OS 102 must use a well-defined interface for the application to issue system calls. In the ARM architecture, normally the system call is invoked by an SWI instruction or invoked by a branch instruction to an address not specifically mapped.

Page protection modification API: the OS102 must provide an API for the user-mode application to modify the protection mode of the memory pages that it is allowed access.

The above-mention functions of OS 102 allow applications in user mode to interact outside the user-space via system calls only.

By detecting and managing system calls, it is possible to accurately monitor and control the use of system resources by applications. This helps prevent system security and privacy from being exposed to possible risks.

One method of detecting the system calls to manage the detected system call is to "hook" and control system calls by modifying the source code of the OS kernel in order to qualify system calls and check the security of the system calls before execution. However, "hooking" system calls in embedded systems can significantly lower the performance of applications, such as execution speed or response speed. In addition, modifying the kernel to introduce the hooking mechanism, increases the risk of introducing bugs into the system.

Therefore, embodiments of this invention ensure system security by user-space virtualization (USV), as opposed to utilizing system call hooks, as described above. The idea that constitutes the core of USV is "native emulation". The application of USV is the same with existing systems when it comes to executing the program of an application compiled with native instructions. However, in this case, with reference to FIG. 1, the native instruction of application 111 is executed in the system virtualized by USV instead of direct execution by CPU 101, which is significantly different than existing systems.

In addition to the virtualization of embedded systems, USV has the following two important functions: capturing system calls to verify security and resource sharing, and dynamically compiling hot spots to be directly executed by the CPU.

The following explains each software function as embodiments of the USV invention. In some embodiments, all the software is executed in the user space.

Figure 2:
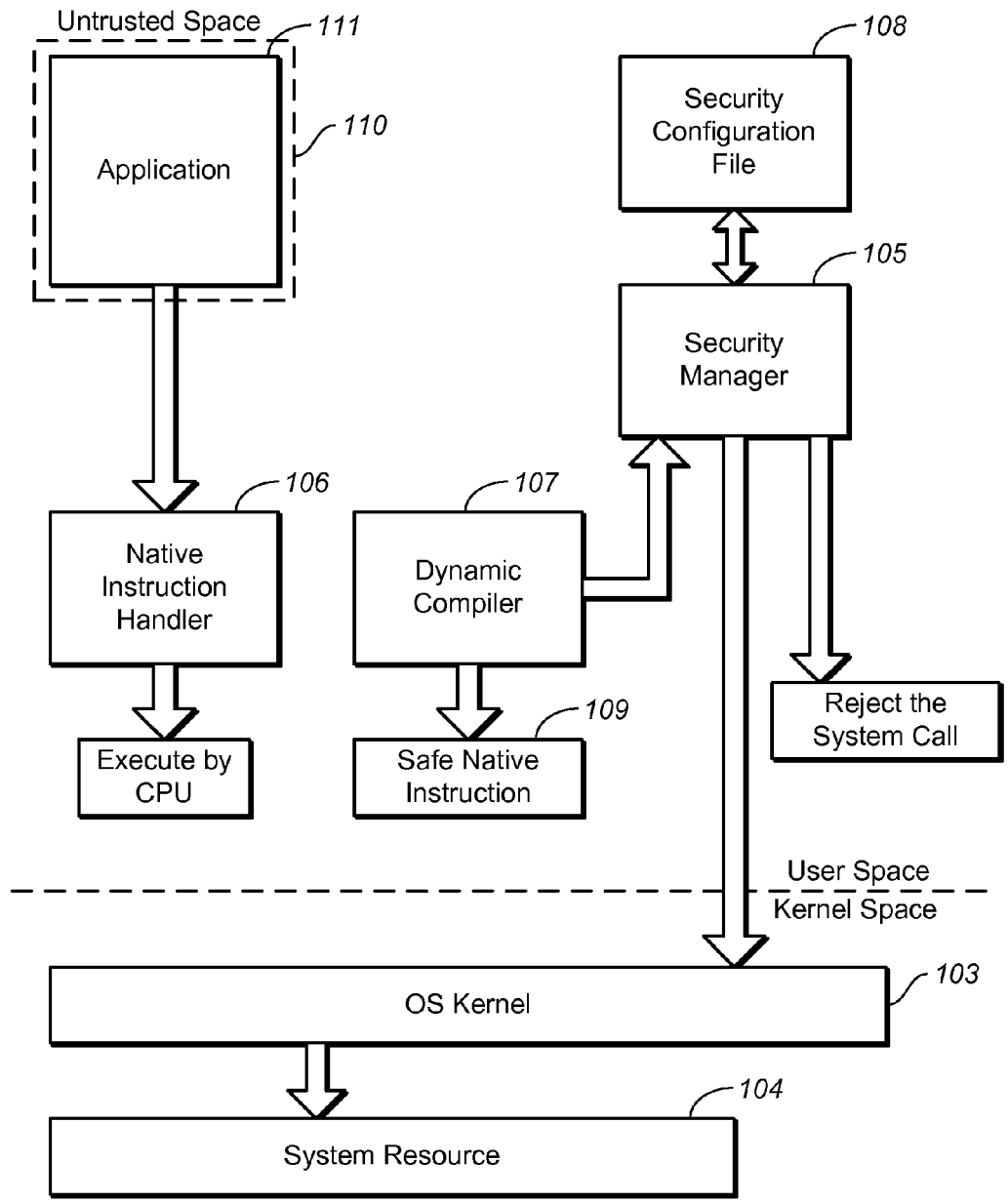
FIG. 2 illustrates a block diagram of the interaction of each software module according to embodiments of the invention.

With reference to FIG. 2, the native instruction handler 106 is used when executing application 111 in the user space. The native instruction handler 106 retrieves, or reads, the native instructions sequences in application 111. If it is detected that an instruction sequence, which when executed, is capable of affecting security, dynamic compiler 107 compiles the instruction sequence and CPU101 executes the compiled code.

On the other hand, other native instruction sequences that are not detected to be capable of affecting security, will be directly executed by CPU 101. For example, the instruction sequence to execute the processing that could affect security may be an instruction sequence that includes SWI command to execute system calls, or code, as in the code shown in FIG. 6, which executes system calls.

Figure 4:
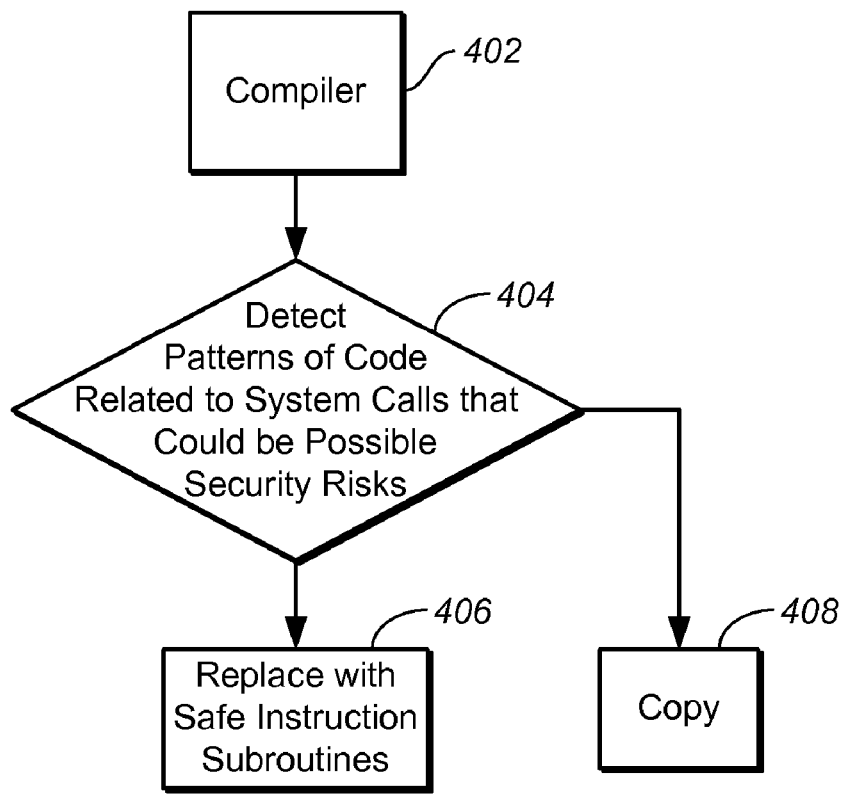
FIG. 4 illustrates an embodiment of the generation of a safe check instruction.
Figure 5:
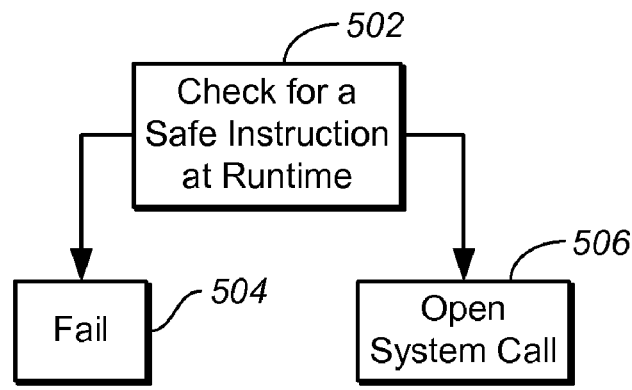
FIG. 5 illustrates execution of an instruction sequence after a safe check instruction has previously been generated according to embodiments of the invention.

With reference to FIGS. 2 and 4, the dynamic compiler 107 compiles an instruction sequence in 402 detected by the native instruction handler 106 into a safe native instruction. Although we refer to "compiling", the actual process is generating another sequence of the same native instruction in which security check processing is added 408 from the native instruction sequence of CPU101.

With reference to FIG. 2, FIG. 8, and FIG. 9, the effects of the compiling by dynamic compiler 107, according to embodiments of the invention, are illustrated. FIG. 8 illustrates the code before compiling. FIG. 9 shows a safe native instruction after compiling respectively in mnemonic code, a programming code that is easy to remember because the codes resemble the original words. The "intercept_open( )" instruction in the FIG. 9 is a virtual mnemonic that holds "system call open( )", and calls a routine to perform a security check. If the security check yields a satisfactory result, then "system call open( )" is called.

As this embodiment shows, the safe native instruction is rewritten from the pre-compile code to execute the processing equivalent of the pre-compile code after checking security. By comparing the codes in FIG. 8 and FIG. 9, it is shown that the dynamic compiler 107 compiles the instruction sequence, which will call a system call, into an instruction sequence that checks security before calling a system call. Therefore, instruction sequences that could affect security never always undergoes security checks before execution. The "safe native instruction" generated through such a compile is stored in a designated memory area that is separate from the memory where the original code of application 111 is stored.

In contrast to traditional compilers that generate native code from the source code of a high level language, the dynamic compiler 107 handles simple processing and does not perform complicated optimization processing.

Accordingly, the complexity of dynamic compiler 107 is less than the usual compilers, which may reduce overhead that could affect a system by compiling. Therefore, it is appropriate for use in embedded systems, where resources are limited.

If native instruction handler 106 detects an unsafe instruction sequence during execution of application 111, application 111 is suspended and dynamic compiler 107 compiles the instruction sequence to generate a safe native instruction sequence. The generated safe instruction sequence is stored in a designated memory address. Subsequently, CPU 101 executes the generated safe native instruction sequence and execution of application 111 resumes. Therefore, when the execution of the generated safe native instruction sequence is completed 502, the native instruction sequence of application 111 is executed with CPU 101 at 506 while the subsequent instruction sequence is checked by native instruction handler 106.

The security manager 105 has a security configuration file that includes information of instruction sequences of application 111 stored in untrusted area 110 for determining the possibility of the execution of the instruction sequence will affect security by application 111, as described above. The information contained in the security configuration file may help to determine if execution of the instruction sequence is authorized, or permitted. The format of a security configuration file may be, for example, in XML format. However, other formats may be used. Further, the security configuration file may be configured to contain information related to accessible address ranges, file types, or hardware resources for each application. Moreover, the security configuration file may be used to determine whether or not access is permitted in accordance with the address ranges, file types, or hardware resources specified.

Figure 3:
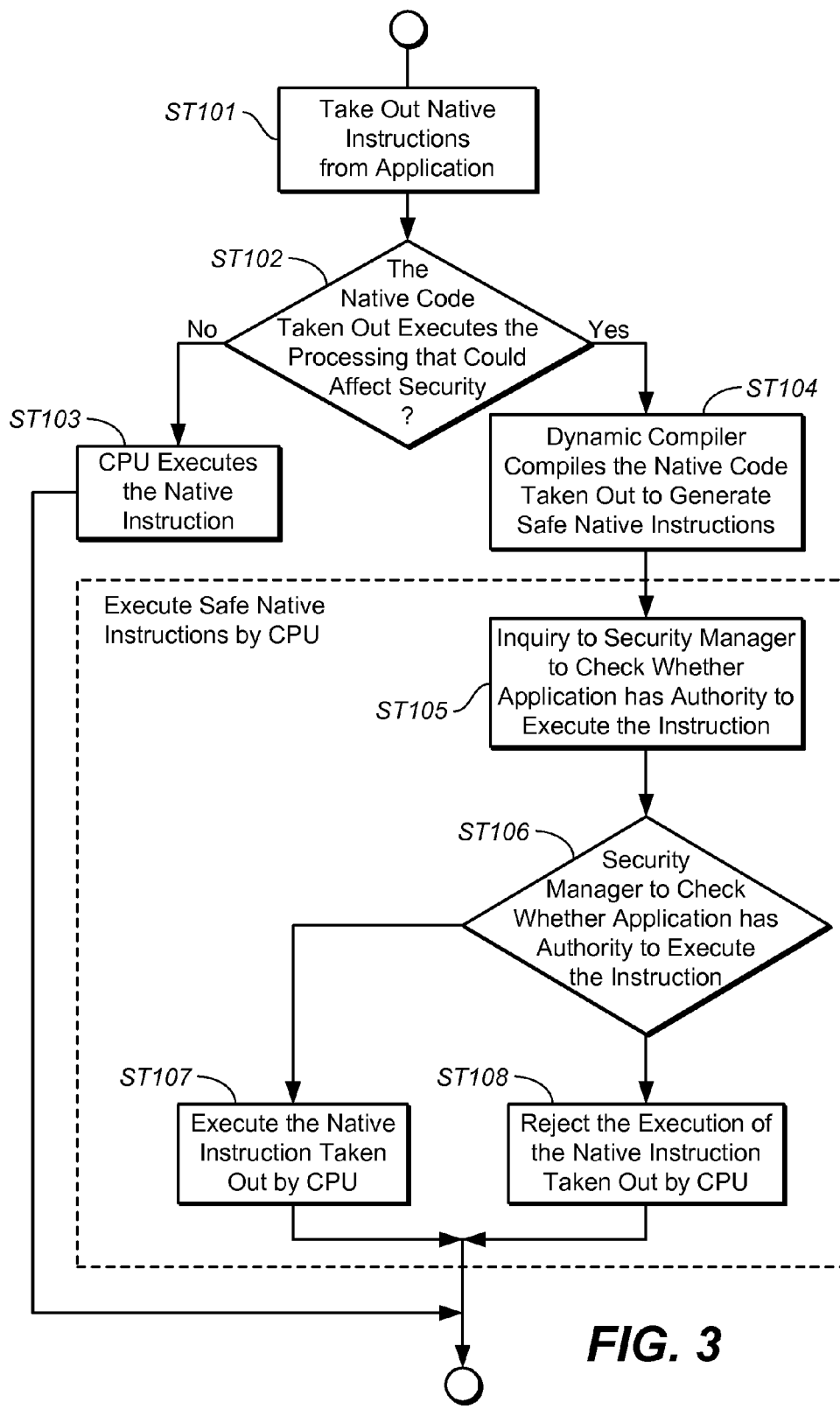
FIG. 3 illustrates a flow chart of behavior of each module according to embodiments of the invention.

The following describes the operations of the native instruction handler 106 and dynamic compiler 107 in the user mode executes by the user space virtualization according to embodiments of the invention. In particular, operations performed when the native instruction handler 106 and dynamic compiler 107, execute application 111 by interacting with security manager 105 through the user-space virtualization according to embodiments of this invention. FIG. 2 illustrates interaction of the software modules illustrated in FIG. 1. FIG. 3 illustrates a flow chart showing which operations are performed by respective software modules.

First, native instruction handler 106 retrieves a native instruction to be executed from the program code of application 111 loaded into the user-space (ST 101). Native instructions may be taken out either individually or collectively.

Then, native instruction handler 106 determines whether or not the retrieved native instruction, when executed, performs a process that could affect security (ST 102). With reference to FIG. 4, the compiler 402 will detect patterns within the native instruction that may indicate a possible security risk 404. This decision is based on whether any native instruction, or sequence, has been registered, such in a security configuration file, as one, that when executed, performs a process that could affect security, and is included in the retrieved native instruction.

If, in ST102, the decision is that the native instruction taken out does not execute any process that could affect security, the native instruction retrieved by native handler 106 is directly executed with CPU101 (ST103).

In contrast, if in ST102 it is decided that the retrieved native instruction executes a process that could affect security, dynamic compiler 107 compiles the retrieved native instruction to generate a safe native instruction 109, which, when executed, performs a process equivalent to the native instruction before the compile, and stores it in a designated address (ST104).

Subsequently, the safe native instruction 109, generated in ST104, is executed with CPU101. As a result, first, an inquiry is generated to security manager 105 to check whether application 111 has authority to execute a process capable of affecting security (ST105). In response to this inquiry, security manager 105 refers to the security configuration file 108 that contains information of the instruction sequence to authorize, or not to authorize, the application 111 (ST106).

In ST106, if security manager 105 determines that application 111 has authorization to execute, the code corresponding to the retrieved native instruction from application 111 in ST101 is executed with CPU101 (ST107). With additional reference to FIG. 2, the system call is issued to the OS kernel 103, which accesses the resource 104 in the kernel space. On the other hand, when application 111 is determined to be not have authorization, the process corresponding to the retrieved native instruction is not executed (ST108). FIG. 2 also illustrates an example when a system call is rejected.

After executing the retrieved native instruction from application 111 as described above, the native instruction to be executed next is processed by repeating the process from ST101. Note that if the retrieved native instruction is not executed in ST108, after notifying application 111 of the occurrence of an error due to authority violation, the execution of application 111 may be cancelled. In other cases, the execution of application 111 may continue, if possible, with a substitute process for which application 111 has authorization for.

The processing described above allows sequential security check of the program of application 111 that consists of native instructions, which enables legacy applications to share resources without modification. Additionally, applications that could contain untrusted and malicious code can also be executed without affecting system security or privacy.

Furthermore, the sequential security check allows for possible overhead to be dispersed more efficiently compared to batch security checks before execution. Moreover, the security check is targeted only to the code to be actually executed, so system load due to a security check can be reduced to a minimum.

Furthermore, the embodiments of this invention may be implemented without modifying the OS kernel, which decreases the risk for introducing bugs. In addition, because application 111 is executed in the form of native code, the performance of application execution is high enough regardless of the system load caused by the native instruction handler 106 or dynamic compiler 107. Furthermore, because the basic architecture of this invention is independent from operating systems or CPU, embodiments of the invention are applicable to diverse platforms.

The foregoing description of the preferred embodiments of the invention has been presented for the purposes of illustration and description. It is not intended to be exhaustive or to limit the invention to the precise form disclosed. Many modifications and variations are possible in light of the above teaching. For example, it is also possible to interpret and execute native instructions by native handler 106, and omit a dynamic compiler. Additionally, caching and reuse of the safe native instruction 109 generated by dynamic compiler 107 is possible. Furthermore, when the security checking is performed safely at least once, it may be possible to modify to add a deletion/simplification or the like, of the instruction to perform security checking. The modified safe native instruction 109 may be saved. Alternatively, the native instruction of the application 111 may be executed by the CPU 101 as it is.

Further, controlling uses of resources function by the application may be provided to the security manager 105 in addition to the confirming the authority of the application function. Therefore, when arbitration of a problem caused by the sharing of the resource in the embedded system is to be conducted (i.e., when a plurality of applications are concurrently using the same resource), authority to allocate use of the resource is implemented in accordance with the purpose of each application and setting of the system.

Figure 10A:
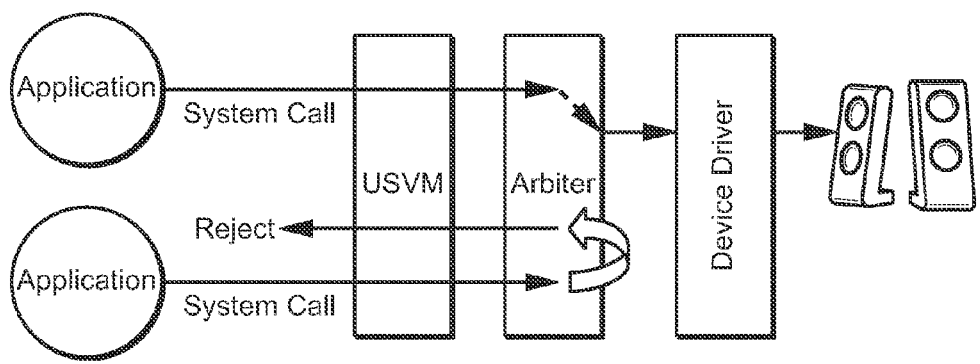
FIG. 10A illustrates an embodiment used for multiple resource arbitration.
Figure 10B:
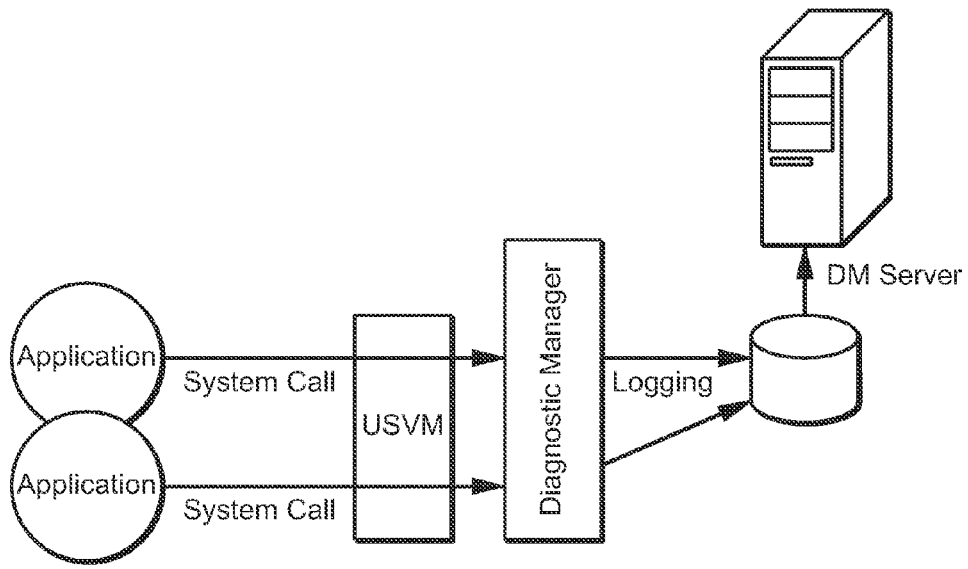
FIG. 10B illustrates an embodiment used for device diagnostics.
Figure 10C:
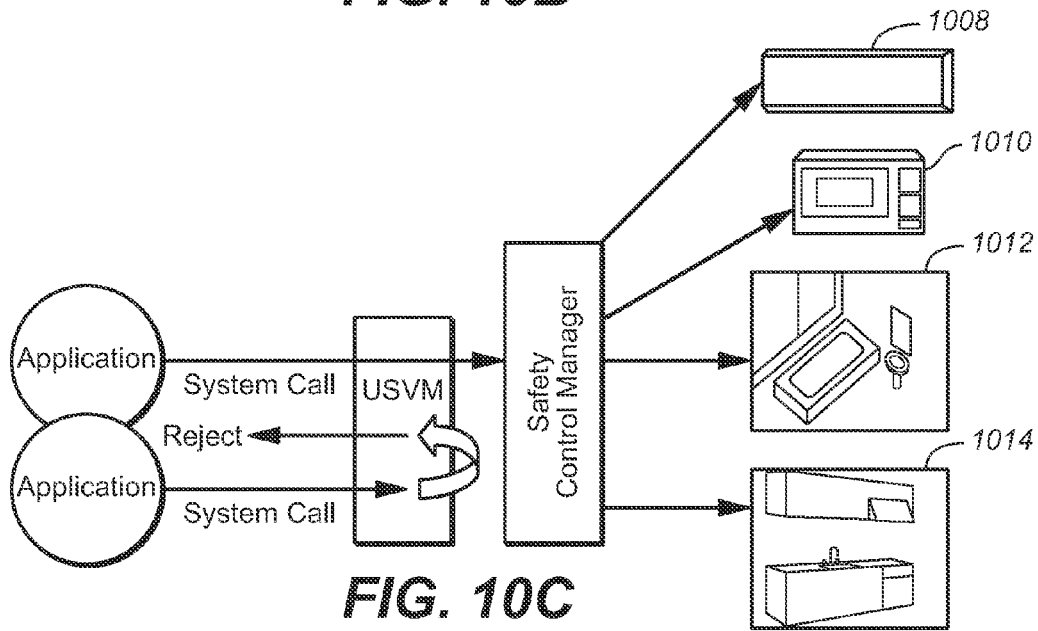
FIG. 10C illustrates an embodiment used for safety control by a home gateway.

Also, as illustrated in FIG. 10A, it possible to set up a function to control resource use of applications in security manager 105 in addition to the function to check application authority. This allows assignment of user rights of resources according to application properties or system settings when several applications simultaneously try to use the same resource. In particular, what is called a resource adjustment becomes a problem in resource sharing in embedded systems. By using a multitask method, you can efficiently develop complicated embedded systems to run several applications. With reference to FIG. 10B, it is possible to set up device diagnostic systems, in which the operator can analyze what user operation actually caused a system crash. Logging would allow a user to discover which system call command was delivered to cause damage to the kernel. Additionally, with reference to FIG. 10C, it is also possible to implement a safety control system by a home gateway for appliances that can receive settings, such as thermostats 1008, microwaves 1010, smart kitchen systems 1012, and showers 1014, for example.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 11:
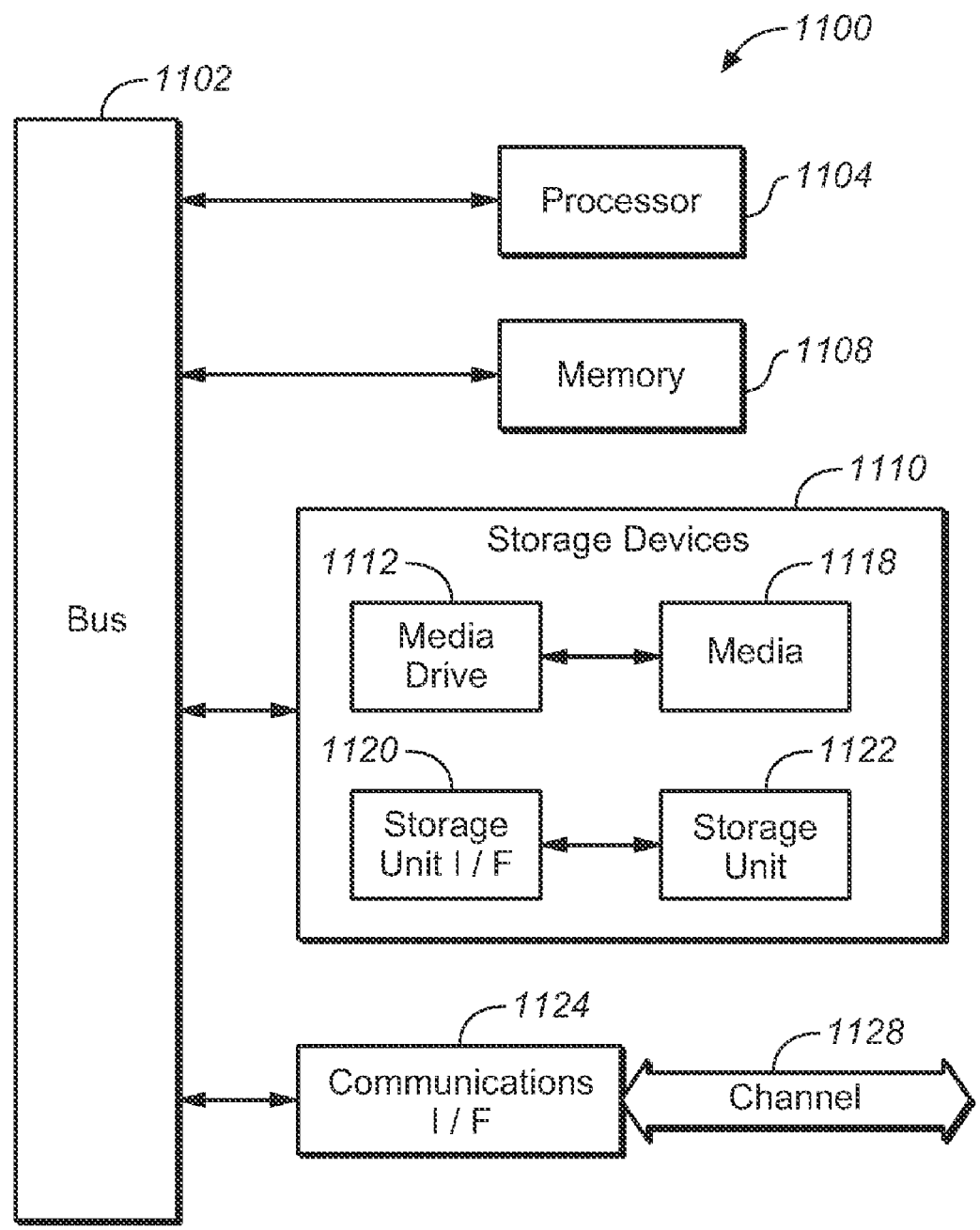
FIG. 11 illustrates a computer system that may be employed to implement embodiments of the invention.

FIG. 11 illustrates a typical computing system 1100 that may be employed to carry out processing functionality in embodiments of the invention. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, supercomputer, server, client, or any other type of embedded system or general purpose computing device as may be desirable or appropriate for a given application or environment. Computing system 1100 can include one or more processors, such as a processor 1104, which may be a CPU. Processor 1104 can be implemented using a general or special purpose processing engine such as, for example, a microprocessor, controller or other control logic. In this example, processor 1104 is connected to a bus 1102 or other communication medium.

Computing system 1100 can also include a main memory 1108, preferably random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory ("ROM") or other static storage device coupled to bus 1102 for storing static information and instructions for processor 1104.

The computing system 1100 may also include information storage mechanism 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1118, may include, for example, a hard disk, floppy disk, magnetic tape, optical disk, CD or DVD, or other fixed or removable medium that is read by and written to by media drive 1114. As these examples illustrate, the storage media 1118 may include a computer-readable storage medium having stored therein particular computer software or data.

In alternative embodiments, information storage mechanism 1110 may include other similar instrumentalities for allowing computer programs or other instructions or data to be loaded into computing system 1100. Such instrumentalities may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 1108, storage device 1118, storage unit 1122, or signal(s) on channel 1128.

These and other forms of computer-readable media may be involved in providing one or more sequences of one or more instructions to processor 1104 for execution. Such instructions, generally referred to as "computer program code" (which may be grouped in the form of computer programs or other groupings), when executed, enable the computing system 1100 to perform features or functions of embodiments of the present invention. These instructions may be included in applications for executing in computer system 1100.

In an embodiment where the elements are implemented using software, the software may be stored in a computer-readable medium and loaded into computing system 1100 using, for example, removable storage drive 1114, drive 1112 or communications interface 1124. The control logic (in this example, software instructions or computer program code), when executed by the processor 1104, causes the processor 1104 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A computer-implemented method for controlling system resources and system security utilizing a user space virtualization program in a user space, the method comprising:

retrieving, by a processor, a native code of an application;

identifying, by the processor executing a native instruction handler, an instruction sequence from the native code, before execution, and if the instruction sequence to perform processing is a possible security risk;

(1): if executing the instruction sequence to perform processing is identified to be a possible security risk, confirming there is an execute authority for the application, wherein the confirming of an execute authority for the application comprises adding a security check instruction to the instruction sequence to generate a safe instruction sequence;

(1-1): if the application is confirmed to have the execute authority for processing, permitting execution of the instruction sequence;

(1-2): if the application is confirmed to have no execute authority for processing, not permitting execution of the instruction sequence;

(1-3): providing an error indication, if the application has no execute authority for processing; and (2): if executing the instruction sequence to perform processing is not a possible security risk, permitting execution of the instruction sequence.

2. The method of claim 1, wherein the safe instruction sequence is executed in a user space.

3. The method of claim 1, wherein the safe instruction sequence initiates the confirming the execute authority of the application.

4. The method of claim 1, wherein the execute authority for the application is confirmed by the security manager.

5. The method of claim 1, wherein the execute authority for the application is confirmed by the processor.

6. The method of claim 1, further comprising:
  detecting an instruction sequence to execute processing, associated with security, from the native code of an application;
  generating native code of the instruction sequence that executes processing, associated with security, after confirming that there is the execute authority of the active application from the native code of the detected instruction sequence; and
  executing the generated code with the processor.

7. The method of claim 6, wherein detecting the instruction sequence comprises checking a security configuration file for registration of the instruction sequence.

8. A non-transitory computer-readable medium encoded with instructions for performing a method for utilizing a user space virtualization program in a user space through execution with a computer, the instructions comprising instructions for:
  retrieving a native code of an application;
  identifying, by a native instruction handler, an instruction sequence from the native code, before execution, and if the instruction sequence to perform processing is a possible security risk:

(1): if executing the instruction sequence to perform processing is identified to be a possible security risk, confirming there is an execute authority for the application, wherein the confirming of execute authority for the application comprises adding a security check instruction to the instruction sequence to generate a safe instruction sequence;

(1-1): if the application is confirmed to have the execute authority for processing, permitting execution of the instruction sequence with a processor;

(1-2): if the application is confirmed to have no execute authority for processing, not permitting execution of the instruction sequence;

(1-3): if the application is confirmed to have no execute authority for processing, providing an error indication; and (2): if executing the instruction sequence to perform processing is not a possible security risk, permitting execution of the instruction sequence with the processor.

9. The non-transitory computer-readable medium of claim 8, wherein the safe instruction sequence is executed in a user space.

10. The non-transitory computer-readable medium of claim 8, wherein the safe instruction sequence initiates the confirming the execute authority of the application.

11. The non-transitory computer-readable medium of claim 8, wherein the execute authority for the application is confirmed by the security manager.

12. The non-transitory computer-readable medium of claim 8, wherein the execute authority for the application is confirmed by the processor.

13. The non-transitory computer-readable medium of claim 8, wherein the instructions further comprise instructions for:
  detecting an instruction sequence to execute processing, associated with security, from the native code of an application;
  generating native code of the instruction sequence that executes processing, associated with security, after confirming that there is the execute authority of the active application from the native code of the detected instruction sequence; and
  executing the generated code with the processor.

14. The non-transitory computer-readable medium of claim 13, wherein detecting the instruction sequence comprises checking a security configuration file for registration of the instruction sequence.

15. An apparatus for controlling system resources and system security utilizing a user space virtualization program in a user space, the apparatus comprising:
  a memory adapted to store computer-readable instructions; and
  a processor adapted to execute the instructions, wherein the instructions, when executed by the processor, perform as:
  a native instruction handler that retrieves a native code of an application and that identifies an instruction sequence, before execution, from the native code associated with security;
  a dynamic compiler that determines if executing the instruction sequence to perform processing is a possible security risk, and that generates a safe instruction sequence;
  a security manager that determines if the application has authority for executing instruction sequences based on the safe instruction sequence; and
  wherein the processor is further adapted to execute for executing the instruction sequence.

16. The apparatus of claim 15, wherein the native instruction handler further checks a security configuration file for registration of the instruction sequence.

* * * * *